Jan. 1, 1929.

B. F. McCOLLUM ET AL 1,697,364

ELEVATING TRUCK

Filed April 8, 1927

4 Sheets-Sheet 1

Inventors
B.F. McCollum
C.E. Thomas

By Jack Ashley
Attorney

Jan. 1, 1929.　　　　B. F. McCOLLUM ET AL　　　　1,697,364
ELEVATING TRUCK
Filed April 8, 1927　　　　4 Sheets-Sheet 2
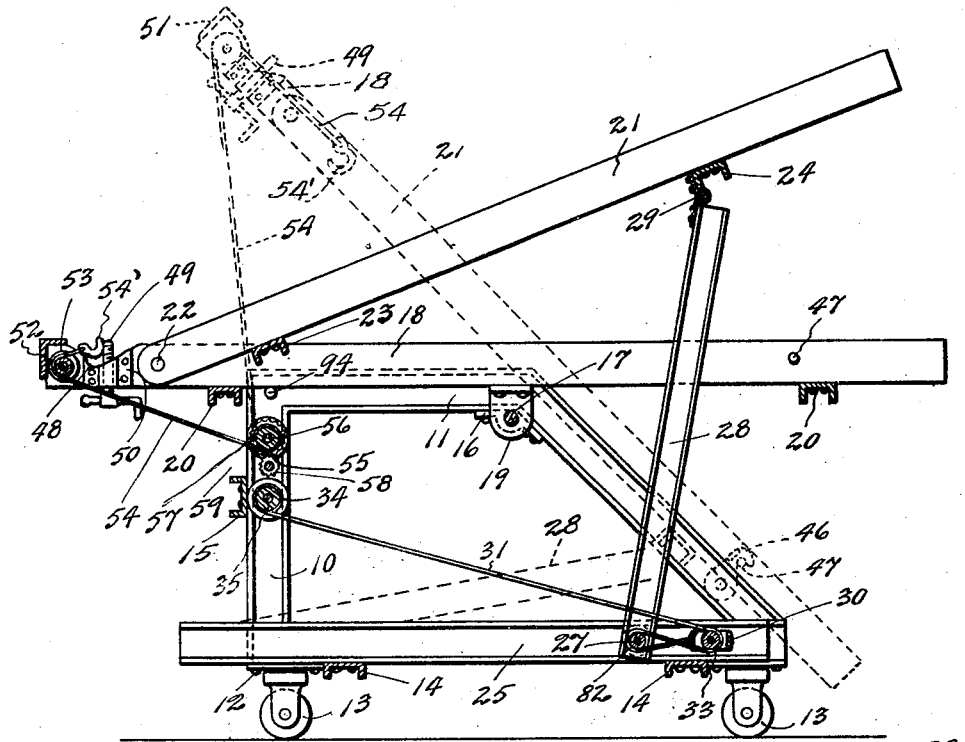
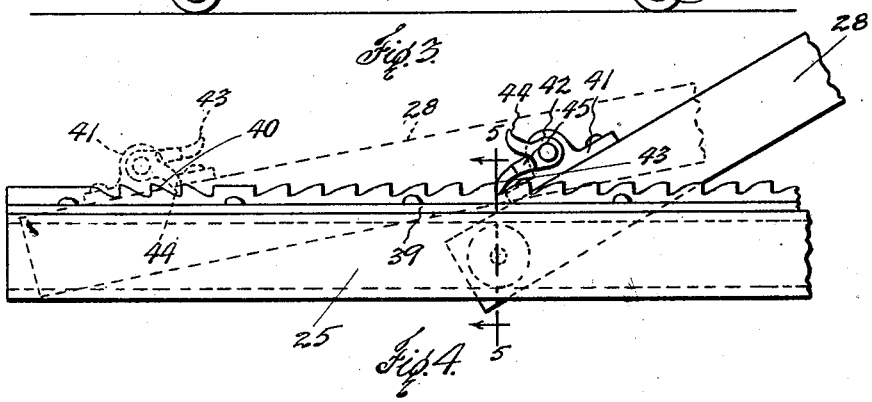
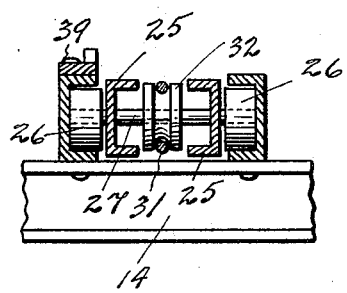
Inventors
B. F. McCollum
C. E. Thomas
By Jack S. Ashley
Attorney

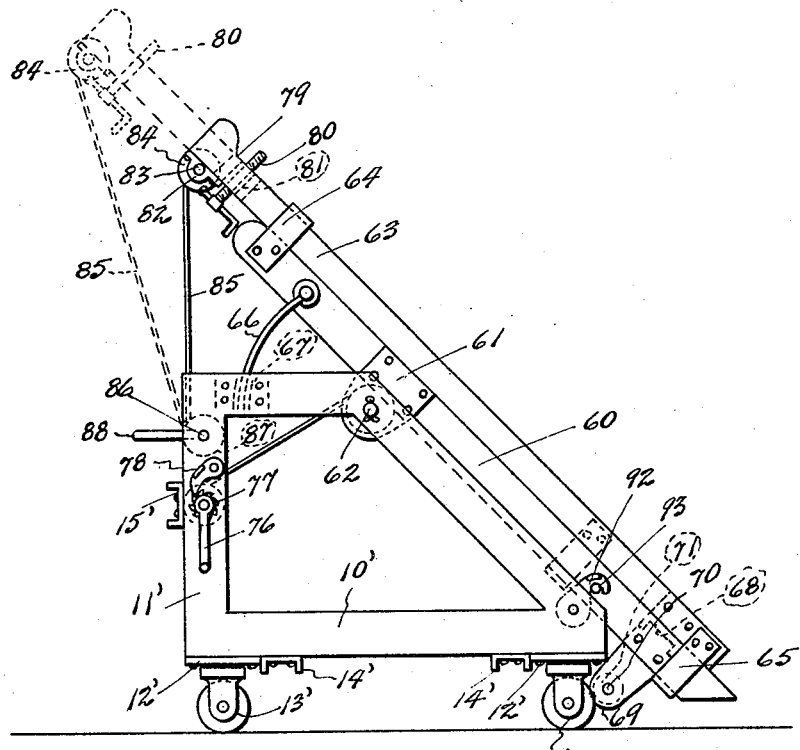
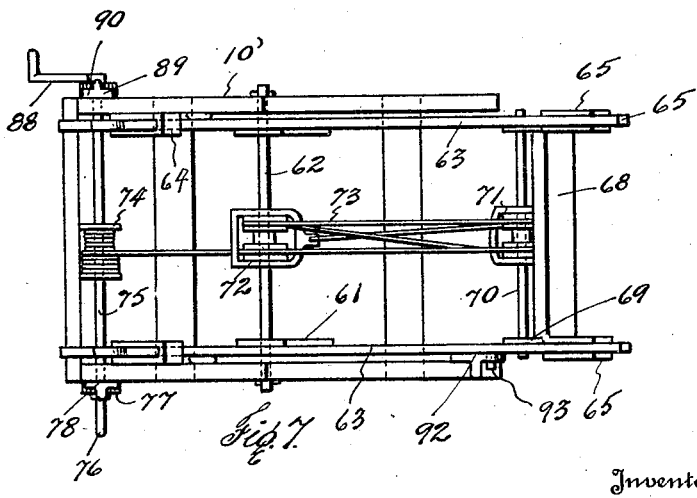

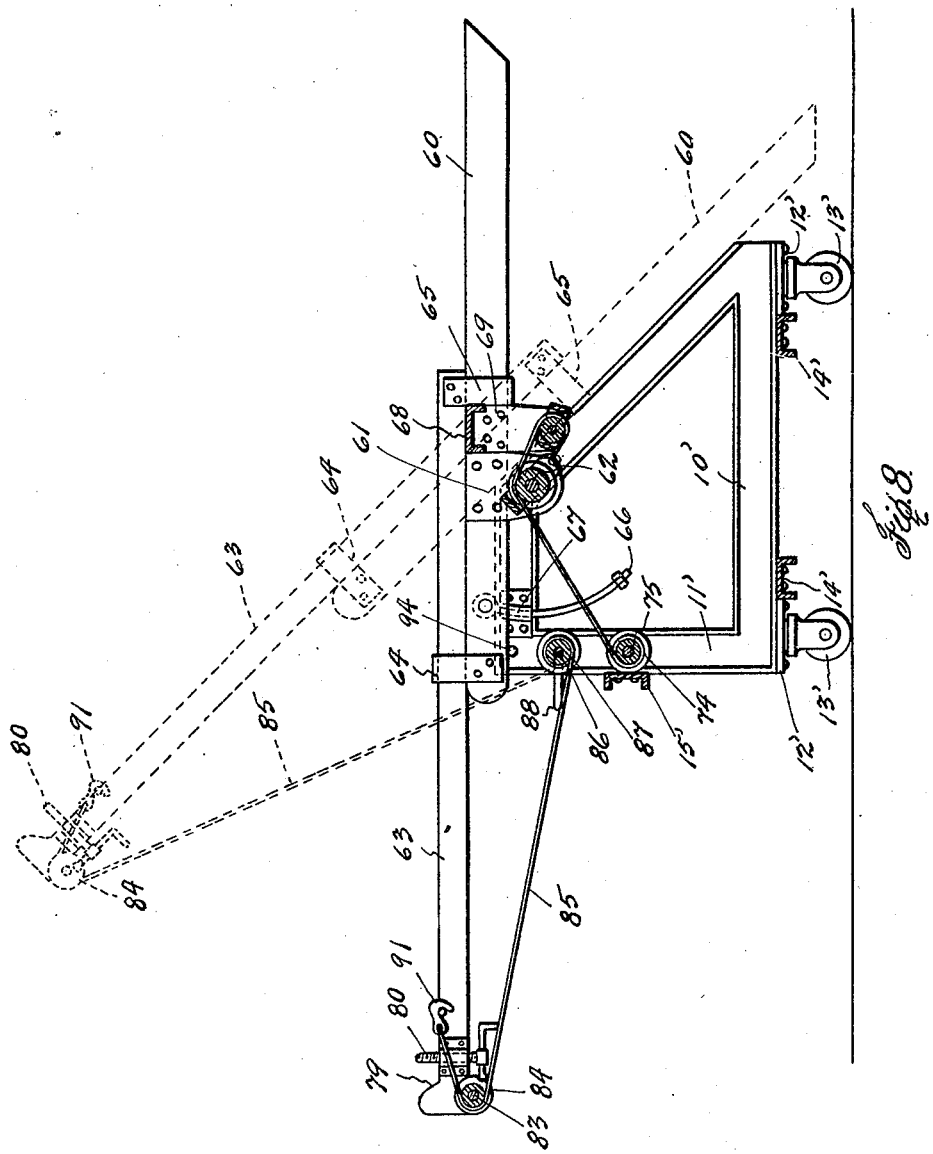

Patented Jan. 1, 1929.

1,697,364

UNITED STATES PATENT OFFICE.

BENJAMIN F. McCOLLUM AND CHARLES E. THOMAS, OF DALLAS, TEXAS.

ELEVATING TRUCK.

Application filed April 8, 1927. Serial No. 182,116.

This invention relates to new and useful improvements in elevating trucks.

The object of the invention is to provide an improved form of truck whereby motor vehicles and the like may be elevated for loading or storing them, or lowered in unloading the same, or elevated and lowered for the purpose of working thereon in repairing said vehicles.

An important object of the invention is to provide a portable truck frame on which swinging bars are mounted and arranged to support the motor vehicle whereby the latter may be raised or lowered.

Another object of the invention is to provide means for fastening the bars at an inclined position together with a cable and drum for pulling a motor vehicle upward on said bars.

A further object of the invention is to provide auxiliary supporting bars hinged to the main bars for elevating the opposite end of the motor vehicle.

A still further object of the invention is to provide novel retaining means at the upper ends of the supporting bars for holding the axle of a motor vehicle therein.

A particular object of the invention resides in a pitman and rack bar mechanism for safely manipulating the supporting bars in raising and lowering the latter.

A construction designed to carry out the invention will be hereinafter described, together with other features of the invention.

Figure 1:
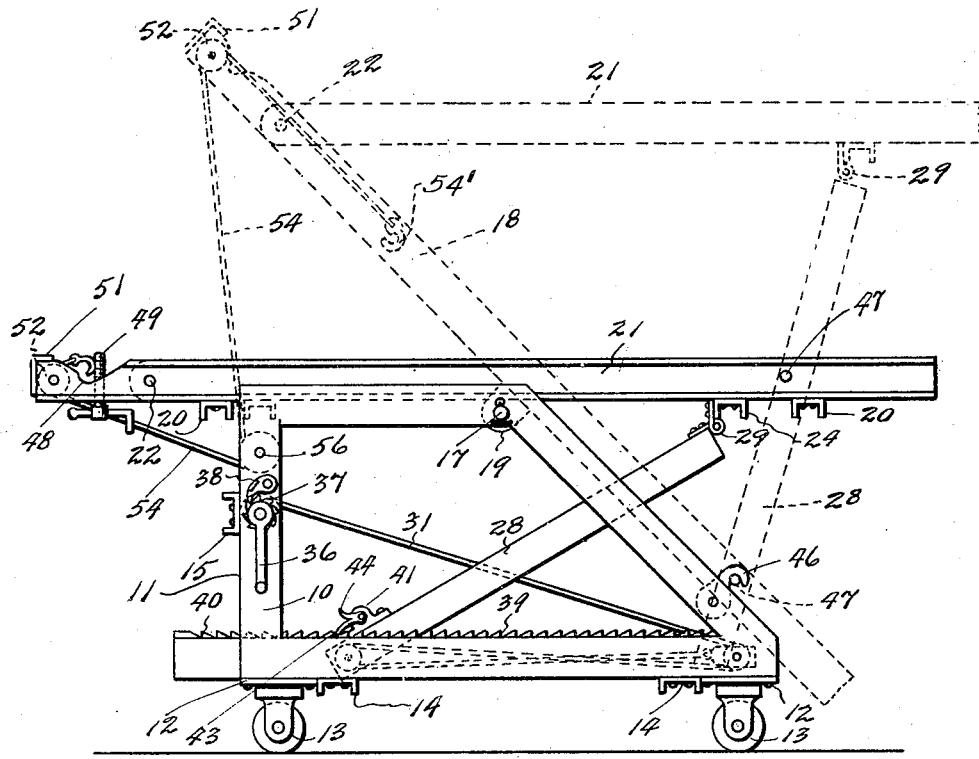
Figure 2:
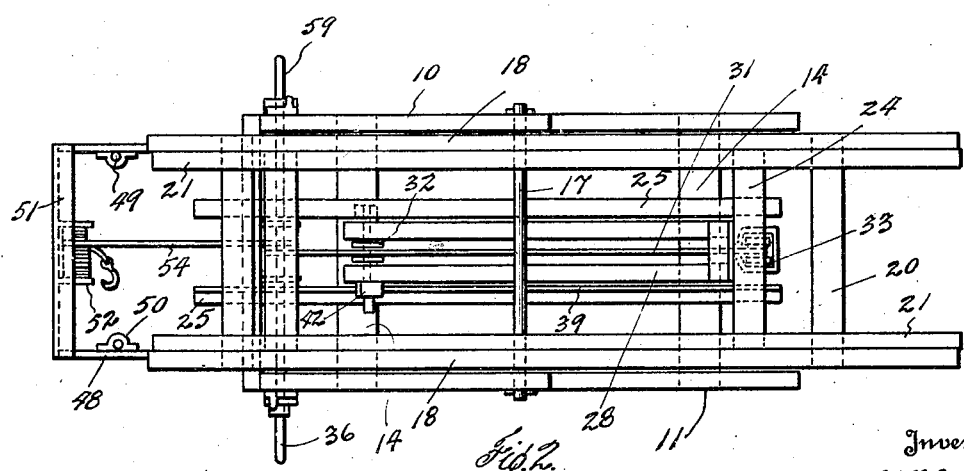

The invention will be more readily understood from a reading of the following specification and by reference to the accompanying drawings, in which an example of the invention is shown and wherein:

Fig. 1 is a side elevation of the truck with the supporting bars in horizontal position, Fig. 2 is a plan view of the same, Fig. 3 is a longitudinal vertical sectional view showing the auxiliary bars elevated and all of the bars in the inclined position in dotted lines, Fig. 4 is a detail of a portion of the track and component parts, Fig. 5 is a cross-sectional view taken on the line 5—5 of Fig. 4, Fig. 6 is a side elevation of another form in which the invention may be carried out, showing the auxiliary bars in dotted lines in their extended position, Fig. 7 is a plan view of the same, and Fig. 8 is a longitudinal vertical sectional view showing the bars in their tilted position in dotted lines.

In the drawings the numeral 10 designates a portable frame comprising upright side members 11 supported on brackets 12 to which casters 13 are swivelled, whereby the frame may be readily moved or turned. The side members are rigidly connected by transverse bottom channel bars 14 and a transverse channel bar 15 connecting the rear uprights of the frame members. The front portions of the side members are inclined, as is shown in the drawings.

Hangers 16 are secured to the frame members at the intersections of the top rails and the inclined front rails and support a transverse shaft 17, which is suitably fastened therein. Supporting bars 18 are provided at their central portions, each with a bracket 19 journaled on the said shaft whereby said bars are mounted to swing or tilt. The bars 18 are connected by cross channel bars 20 near each end.

Auxiliary supporting bars 21 are disposed between the bars 18 and in close relation thereto, having their upper ends pivoted thereto at 22. The auxiliary bars are connected near their upper ends by a cross-bar 23 and near their lower ends by a cross- or head-bar 24. It will be seen that the bars 21, being pivoted at their upper ends, will rest upon the cross-bars 20 and will swing with the bars 18 except when separately moved. We have illustrated a great many of the parts as made of channel shaped members, but it is to be understood that such shapes as may be found practical and best suited for the purpose may be used.

On the bottom bars 14 are disposed longitudinal channel members 25 forming a track for rollers 26 journaled on a shaft 27 mounted in the bottom of a pitman 28. The pitman has its upper end connected to the head bar 24 by a hinge 29. It will be seen that by moving the lower end of the pitman along the track the supporting bars will be swung upwardly owing to the pivotal arrangement thereof.

A sheave block 30 is suitably anchored between the forward ends of the channel members 25 and a cable 31 has one end secured to this block from which it extends rearly and passes around a pulley 32 journaled on the shaft 27. The cable returns from the under-side of the pulley and passes around the sheave 33 of the block 30 from which it extends to a drum 34. The cable is suitably fastened to the drum and the latter is secured on a shaft 35 journaled in the frame members 11. A crank 36 is attached to one end of the shaft. The shaft has a ratchet 37 which is engaged by a dog 38 mounted on one of the frame members. By revolving the shaft the cable is wound upon the drum and the lower end of the pitman caused to travel along the track.

On one of the channel members 25 is provided a rack bar 39 having the teeth throughout the greater portion of its length directed forwardly, but having a few teeth 40 at its rear end directed rearwardly. On the pitman is secured a bracket 41 carrying a dog 42 provided with a finger 43 curved in one direction and a finger 44 curved in the opposite direction. The dog also has a wing 45 projecting therefrom and by which it may be swung. With the supporting bars in their normal inclined position, as is shown in dotted lines in Fig. 3, the lower end of the pitman will be at the rear end of the track. The dog is swung so that the finger 44 will engage the teeth 40 and this will prevent a forward movement of the pitman and revolving of the drum until the dog has been swung to cause the finger 43 to rest on the rack bar. This provides a safety feature and assures that the dog will be in proper position to engage the remaining teeth of the rack bar when the supporting bars are being elevated. It will be seen that when the pitman has been moved forwardly, as above stated, and the supporting bars elevated, the dog must be swung so that the finger 43 will be lifted from the teeth and the finger 44 caused to ride thereover so that the pitman may be allowed to move rearwardly and the bars to swing downwardly. The dog 38 is used to engage the ratchet 37 to prevent unwinding of the drum.

Where it is desired to swing the auxiliary bars 21 without swinging the bars 18, a hook 46 pivoted on one of the frame members is engaged over a pin 47 (Figs. 1 and 3) carried by one of the bars 18. Thus when the pitman 28 is pulled forwardly by the cable 31 only the bars 21 will be elevated. It is desirable to have seats 48 in the upper ends of the side bars 18 for receiving the axle of the vehicle and in order to retain the axle in the seats, retaining screws 49 are mounted in brackets 50 on the bars 18 and these screws prevent a downward displacement of the axle when the bars are inclined.

In certain instances an auxiliary cable may be used and in such cases a connecting bar 51 is secured across the upper ends of the bars 18 for supporting a bracket 52 carrying a pulley 53. A cable 54 passing over the pulley is attached to a drum 55 mounted on a shaft 56 journaled in the side members 11 above the shaft 35. A gear 57 is fastened on the shaft and is operated by a pinion 58 mounted on a crank shaft 59. It will be seen that the cable 54 may be attached to a motor vehicle at the lower ends of the bars 18 and by winding the cable on the drum 55 the vehicle may be pulled upwardly on the bars 18 until its rear axle rests in the seats 48. The vehicle may be likewise lowered.

In using the truck for loading vehicles in freight cars for the purpose of double decking said vehicles, the supporting bars are adjusted to the inclined position shown in dotted lines in Fig. 1 by slacking cable 54 and manually tilting the bars. The vehicle is placed by hoist or otherwise on the supporting bars 18 with the rear axle resting in the seats 48. The retaining screws 49 are then adjusted to stand in front of the rear axle. The bars are released from hooks 46 and tilted to a horizontal position by downward draft of cable 54 connected at their upper ends and the wheels then removed. The truck is then rolled into the freight car. Owing to the nearly balanced mounting of the bars 18 on the frame 10, the said bars may be readily tilted to the inclined position as is shown in dotted lines in Fig. 3, the bars 21 remaining parallel thereto. This elevates the rear axle and the hook 46 is then engaged with the pin to hold the parts in position while the standards are built and the rear axle fastened therein.

After the rear axle is secured, the drum 34 is revolved to wind the cable 31, the dog 42 having been shifted from the locking position shown in dotted lines in Fig. 4. As the drum is wound the cable is pulled over the pulley 32 and around the sheave 33, whereby the pitman 28 is pulled forwardly. The front end of the pitman is elevated and swings the bars 21 upwardly, as is shown in dotted lines in Fig. 1, thus elevating the front axle of the vehicle so that the front standards may be built. The bars are then lowered and the truck removed.

In unloading a vehicle from an elevated position, the bars are swung to the inclined position as is shown in Fig. 3 and the hook 46 is engaged with the pin 47. The bars 21 are then elevated to engage the front axle of the vehicle. After the front standards (not shown) are removed, the bars 21 are lowered to the bars 18 and the rear standards are then removed. Then the bars are all swung to the horizontal position to truck the vehicle from the freight car. The wheels are then mounted on the axles.

When it is desired to discharge the vehicle from the truck, the bars 18 and 21 are again tilted in the inclined position and fastened, as is shown in Fig. 3. The hook 54' is engaged with the rear axle of the vehicle and the retaining screws 49 are withdrawn. By revolving the drum 55 the cable 54 is unwound and the vehicle permitted to slide down the bars. A vehicle may be pulled up onto the bars by this cable and elevated to different positions for inspection and repairing if desired. Various adjustments of the bars may be made for handling vehicles.

In Figs. 6, 7, and 8 we have shown another form in which a frame 10', having side members 11', brackets 12', casters 13', bottom bars 14' and a channel bar 15', is used. Supporting bars 60 are provided with brackets 61 fulcrumed on a shaft 62 mounted on the side members 11 so that the bars 60 may incline downwardly along the front of the frame.

Auxiliary bars 63 are arranged to slide on top of the bars 60 sliding through guide loops 64 at the upper ends of the bars 60 and carrying guide loops 65 at their lower ends embracing the bars 60. The lower ends of the bars 60 are beveled at their lower ends and the swinging movement of the bars is limited by curved links 66 pivoted to the bars 60 above the shaft 62 and sliding through keepers 67 on the inside of the frame members 11'.

For sliding or telescoping the bars 63 we provide a block and cable means. A cross head 68 is connected between the lower ends of the bars 63 and has hangers 69 depending between the bars 60 and carrying a cross bar 70 on which a double sheave block 71 is mounted. A double sheave block 72 is mounted on shaft 62. A cable 73 having one end attached to the block 72 passes to the block 71, thence to the block 72, thence back to the block 71 and finally through the block 72 to a drum 74. The drum is mounted on a shaft 75 journaled in the truck frame. A crank handle 76 is mounted on one end of the shaft adjacent a ratchet wheel 77 engaged by a dog 78 on the side of one of the frame members 11'.

By revolving the shaft 75 the drum is also revolved and the cable 73 is wound thereon. This causes the block 71 to be pulled toward the block 72, whereby the cross head 68 is moved upwardly and the bars 63 are slid on the bars 60. At their upper ends the bars 63 have seats 79 and retaining screws 80 mounted in brackets 81 on the sides of said bars.

Hangers 82 on the upper ends of the bars 63 support a shaft 83 on which a pulley 84 is journaled. A cable 85 has one end wound around a drum 87 mounted on a shaft 86 journaled on the truck frame. This shaft has a crank handle 88 and a ratchet wheel 89 engaged by a dog 90. The cable 85 extends up over the pulley 84 and has a hook 91 on its end. The drum 74 is operated to slide the bars 63 to elongate the carriage formed by the bars 60 and 63.

The cable 85 may be unwound and attached to the rear axle of a vehicle and the latter pulled up the inclined bars 63. A hook 92 mounted on the frame is engaged with a pin 93 on one of the bars 60 to prevent tilting. When the rear axle reaches the seats 79, the screws 80 which were retracted, are now adjusted to catch the said axle and hold the vehicle.

The hook 92 is then disengaged and the bars are swung to a horizontal position so that the wheels may be removed and the truck rolled into a freight car. When the truck is in position in the car the bars are swung or tilted downward and hooked. By telescoping the bars 63 downwardly the front axle (not shown) is caused to rest on the floor, while the rear axle remains elevated.

By continuing the downward telescoping of the bars 63 the rear brake drums come to rest at the top of the side wall of the car and the seats 79 ride out from under the rear axle. This leaves the vehicle properly positioned in the car. The truck may then be easily removed from under the vehicle without further adjustment.

In unloading, the bars 60 are swung into the inclined position and hooked. The bars 63 are adjusted upwardly so as to engage the rear axle of the vehicle in the seats 79 and the screws 80 are turned to retain said axle. The fastenings are removed from the rear axle, the bars telescoped to raise the front axle from the floor, and the truck manipulated until the bars and vehicle can be swung to a horizontal position and rolled from the car. The wheels are placed on the vehicle axles and the bars are then swung to an inclined position, whereby the front wheels support the front axle. The screws 60 are retracted and the vehicle is permitted to slide down the bars 63 as the cable 85 is unwound.

In each form, stop pins 94 are provided on the inside of the rear end of each frame member, at the upper portion to form rests for the supporting bars 18 and 60, when the latter are swung to a horizontal position. In the form shown in Figs. 1 to 5 inclusive, the lower bar 20 rests upon the channel track members 25 to support the bars 18 in an inclined position. In Figs. 6, 7 and 8 the links 66 stop the bars 60 in an inclined position.

Various changes in the size and shape of the different parts, as well as modifications and alterations, may be made within the scope of the appended claims.

What we claim, is:

1. In an elevating truck, a portable truck frame, elongated supporting bars fulcrumed intermediate their ends on the frame, auxiliary bars pivoted to the supporting bars, a pitman pivoted to the auxiliary bars, a cable attached to the pitman, a sheave block on the frame through which the cable passes, and a drum on the frame on which the cable is wound.

2. In an elevating truck, a portable truck frame, elongated supporting bars fulcrumed intermediate their ends on the frame, auxiliary bars pivoted to the supporting bars, a pitman pivoted to the auxiliary bars, a track on the frame, rollers on the lower end of the pitman, means for moving the lower end of the pitman longitudinally of the track, and means for holding the pitman in adjusted positions.

3. In an elevating truck, a portable truck frame, elongated supporting bars fulcrumed on the frame, auxiliary bars pivoted to the supporting bars, a pitman pivoted to the auxiliary bars, a track on the frame, rollers on the lower end of the pitman, means for moving the lower end of the pitman longitudinally of the track, a rack bar carried by the track, and a dog carried by the pitman and engaging the teeth of the rack bar.

4. In an elevating truck, a portable frame, opposite elongated supporting bars fulcrumed intermediate their ends on said frame, means on the upper portion of the frame spaced from the fulcrums of the bars for supporting said bars in a horizontal position, auxiliary bars each pivoted at one end to the supporting bars near one end of the latter and having free ends, means for vertically swinging the free end of the auxiliary bars independently of the supporting bars, either when said suporting bars are inclined or horizontal, and means at the upper ends of the supporting bars for retaining a load carried on the supporting bars.

5. In an elevating truck, a portable frame, opposite supporting bars forming trackways and fulcrumed upon the frame for tilting movement relative thereto, means for retaining one end of a vehicle upon said bars, auxiliary bars pivoted at one end of the supporting bars and movable relative thereto to engage and elevate the opposite end of a retained vehicle, and means for moving the auxiliary bars.

6. In an elevating truck, a portable frame, opposite supporting bars forming trackways and fulcrumed upon the frame for tilting movement relative thereto, means for retaining one end of a vehicle upon said bars, auxiliary bars pivoted at one end of the supporting bars and movable relative thereto to engage and elevate the opposite end of a retained vehicle, means for moving the auxiliary bars, and a detachable connection between the frame and supporting bars when in an inclined position.

7. In an elevating truck, a portable frame, supporting bars pivoted on the frame and forming trackways, means for retaining one end of a load upon said bars, means for supporting said bars in either a horizontal or inclined position on said frame, auxiliary bars mounted at one end upon the supporting bars for movement into angular relation to the supporting bars for elevating the opposite end of a load therefrom, and means for moving the auxiliary bars independent of the supporting bars.

8. In an elevating truck, a portable frame having a horizontal top wall and inclined end wall, supporting bars forming trackways fulcrumed upon said frame at the intersection of said walls, draft means connected to the upper ends of said bars and to the frame, and auxiliary bars adjustably mounted upon the supporting bars for movement relative thereto and adapted to engage and raise one end of a load whose opposite end is carried by said supporting bars.

9. In an elevating truck, a frame, supporting bars forming trackways extending longitudinally of the frame and fulcrumed thereto intermediate their ends, means upon said frame for suporting said bars in either a horizontal or inclined position, auxiliary bars pivoted at one end to the supporting bars and having their free ends normally disposed parallel thereto, means for engaging said free ends of the auxiliary bars for swinging them independently of the supporting bars to elevate one end of a load whose opposite end is carried by the supporting bars, and means for detachably securing the supporting bars to the frame in an inclined position during the movement of the auxiliary bars.

10. In an elevating truck, a frame, longitudinally extending supporting bars forming trackways and fulcrumed intermediate their ends on the frame, means for attaching a load at one end of said bars, auxiliary bars pivoted at the load attaching end of the supporting bars and disposed with their free ends normally parallel thereto, a pitman pivoted to the auxiliary bars and slidingly mounted at its lower end, and means for operating the pitman to swing the free end of the auxiliary bars relative to the supporting bars to raise the opposite end of a load attached thereto.

In testimony whereof we affix our signatures.

BENJAMIN F. McCOLLUM.
CHARLES E. THOMAS.